Jan. 20, 1953 W. W. VOSS 2,626,106
CONTROL APPARATUS
Filed Feb. 9, 1948 3 Sheets-Sheet 1
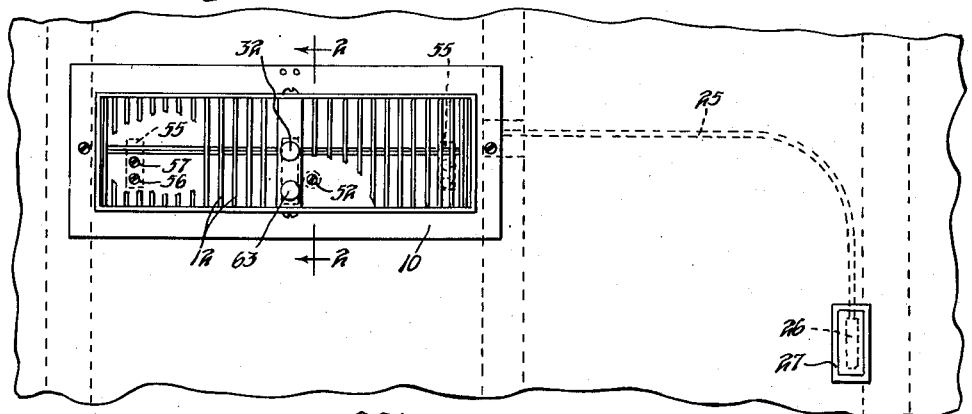
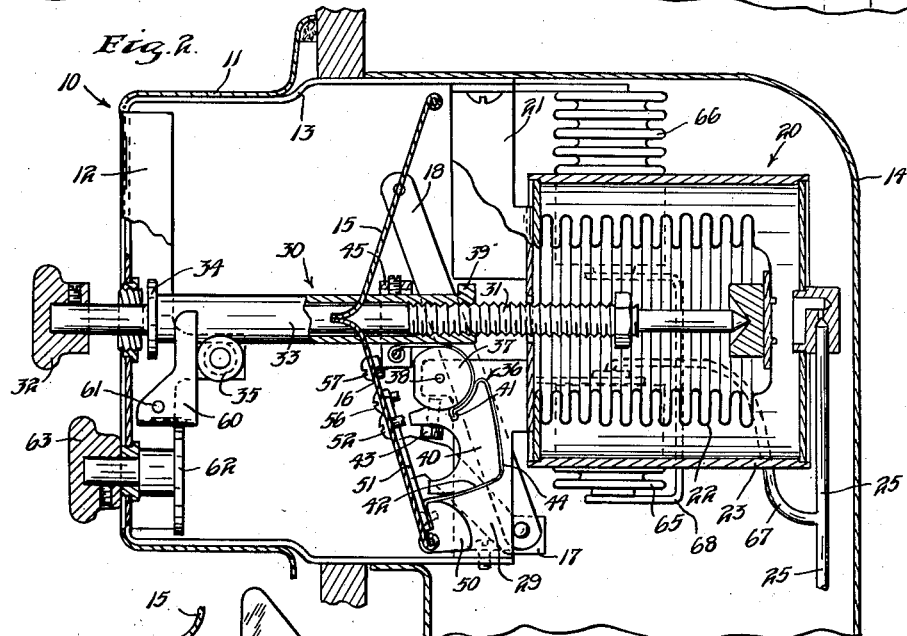
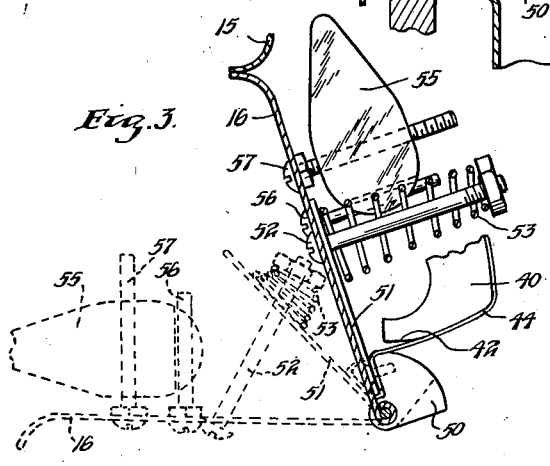
Inventor
WALTER W. VOSS
By George H. Fisher
Attorney Jan. 20, 1953 W. W. VOSS 2,626,106
CONTROL APPARATUS
Filed Feb. 9, 1948 3 Sheets-Sheet 2

Inventor
WALTER W. VOSS

By George N. Fisher
Attorney

Jan. 20, 1953 W. W. VOSS 2,626,106
CONTROL APPARATUS

Filed Feb. 9, 1948 3 Sheets-Sheet 3

Inventor
WALTER W. VOSS

By George H. Fisher
Attorney

Patented Jan. 20, 1953

2,626,106

UNITED STATES PATENT OFFICE 2,626,106

CONTROL APPARATUS

Walter W. Voss, Chicago, Ill., assignor to Minneapolis-Honeywell Regulator Company, Minneapolis, Minn., a corporation of Delaware Application February 9, 1948, Serial No. 7,272

8 Claims. (Cl. 236—49)

This invention relates to automatic dampers for registers used with air conditioning systems.

Control apparatus is now commercially available for controlling forced air temperature changing systems by regulating the temperature of the circulating air to provide the degree of heating or cooling desired. However, this apparatus cannot properly control the temperature in plural zone installations where the zones have different heating or cooling requirements. By using the present registers for each of the outlets of the forced air systems, each room becomes in effect an individually controlled zone and can therefore be controlled as desired regardless of variations in exposure, occupancy and the like.

It is therefore a principal object of this invention to provide an improved automatic register for use with forced air temperature changing systems.

It is a further object to provide an automatic air outlet control simple to construct and install and effective in operation.

It is also an object to provide an air flow control apparatus that may be used in either a high or low location and still permit a proper location of the controlling thermostat.

It is an additional object to provide an automatic register having a controlling thermostatic device subject to the temperature of an adjacent duct but relatively unaffected thereby.

It is a further object to provide an automatic register having means for compensating its fluid actuator for variations in duct temperature.

It is another object to provide an automatic register actuated by a heat motor and having means for automatically reversing the sequence of operation of the actuator in response to the presence of heated or cooled medium within the supply duct.

It is also an object to provide a register having dampers actuated by a thermostatic device wherein the dampers are counter-weighted to require a minimum change in force by the actuator for operating them throughout their range of adjustment.

It is an object to provide an automatic damper having manual adjusting means capable of overriding the automatic mechanism, said damper also being provided with strain release means preventing over-stressing of the damper actuating mechanism.

These and other objects will be apparent upon a study of the following specification and drawings wherein:

Figure 1 is an elevation view of an automatic register embodying the present invention, with parts broken away.

Figure 2 is a partial sectional view taken on the line 2—2 of Figure 1.

Figure 3 is a view similar to Figure 2 but showing parts not clearly apparent in Figure 2.

Figure 4:
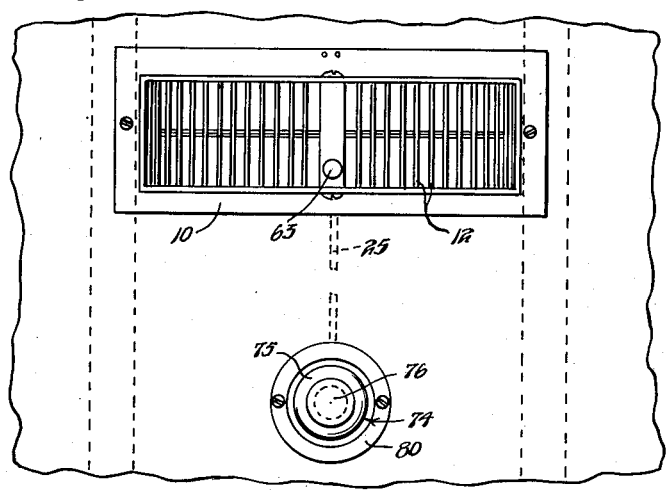
Figure 4 is an elevation view of a modification of the structure shown in Figure 1.

The present invention may be incorporated in the registers for forced air temperature changing systems, or may be used for dampers mounted in the ducts leading to outlets, but preferably it is used to control the dampers of registers such as disclosed in the copending application of Hermanson et al., Serial No. 656,274, filed March 22, 1946. In the drawings, register 10 includes an outwardly projecting portion 11 having air directing blades 12, the outwardly projecting portion 11 being built about an inner member which may be termed a frame, or frame portion 13 of the register, the rearward portion of this frame extending into the duct 14 which is connected to the air conditioning apparatus. Horizontally extending damper blades 15 and 16 are hingedly mounted to the frame portion and are arranged to open outwardly, as in the above cited application. A lever 17, attached to blade 16, is connected by link 18 to blade 15 so that an opening or closing movement of one of the blades causes a corresponding movement of the other blade.

To operate damper blades 15 and 16 of the above described register, a fluid motor 20 is attached to frame portion 13 of the register by brackets 21 and 29, said motor 20 including a flexible bellows 22 arranged inside an outer cup-like member 23 to form a fluid tight space between said bellows and member 23, this space being filled with a suitable fluid. Motor 20 is connected to a capillary tube 25 to a thermostatic bulb 26 responsive to room air temperature and concealed by a suitable cover 27 on the wall of a room in which register 10 is located, as shown in Figure 1. An increase in temperature of bulb 26 causes an expansion of the liquid therein, assuming that motor 20, tube 25 and bulb 26 are completely filled with an expansible liquid, which is transmitted through tube 25 to motor 20, thereby causing a movement to the left of the abutment portion of bellows 22, or a slight contraction of the same.

To transmit the motion of the bellows 22 to damper blades 15 and 16, a horizontally movable member 30 is axially aligned with the bellows and projects from the abutment portion of the bellows out through the front of the register. Member 30 comprises an inner threaded member 31 bearing at one end against bellows 22 and having an adjusting knob 32 attached to its other end. The member 30 is completed by an outer sleeve member 33 disposed over an intermediate portion of 31 and provided with an inner threaded portion for coacting with the threads of member 31 so that rotation of member 31 relative to 33 varies the relative position of 33 on 31. The outermost portion of member 33 is provided with a flange 34 for a purpose which will appear. Sleeve 33 of member 30 is guided by a roller guide means 35 and by a combined guide and cam structure 36, said structure 36 including a partly cylindrical member 37 pivoted at 38, pivot 38 being mounted in bracket 29. Member 30 is thus able to roll on member 37, and because of a transverse guide member 39 which coacts with the lower edge of brackets 21, member 33 is prevented from turning when knob 32 is rotated. Preferably, although not shown, the bottom side of member 33 is flattened to further assist in preventing rotation of said member and to provide a broader bearing area between members 33 and 37. A member 40 having a retaining groove 41 and an outer curved surface 42 is attached to member 37 by a cap screw 43, with a folded intermediate portion of a tape 44 disposed between members 40 and 37 and having a fold in groove 41, tape 44 thereby being held firmly in place. Further, if desired, a suitable pin or key member may be inserted in said fold to assist in firmly anchoring said tape. One end of tape 44 extends over member 37 and between member 37 and member 33, the end of this portion of the tape being clamped to member 33 by clamp 45. The other end of tape 44 extends over the outer surface of member 40 and along its surface 42 and is clamped between a sector member 50 and a strain release lever 51, as shown in Figures 2 and 3. Sector member 50 is provided to hold the tape 44 at a uniform radius about the pivot of damper blade 16 at all times. Strain release lever 51 is pivoted in alignment with the pivot of damper blade 16 and is normally held against blade 16 by a bolt 52 and a compression spring 53. Tape 44 may be of any flexible and relatively strong material, a woven glass fibre material reinforced by a synthetic resin binder being used in the present instance. Tape 44 is connected to damper 16 through strain release lever 51 to prevent undue stresses being imposed on the tape in case of a jamming of the blades, improper handling of the damper prior to its installation, or otherwise.

With tape 44 securely attached to cam-like member 36 and with its ends attached to sleeve 33 of member 30 and, indirectly, to damper blade 16, longitudinal movement of member 30 causes a rotative movement of member 36 and a pivotal movement of damper blades 15 and 16, blade 15 being caused to move simultaneously with 16 because of crank arm 17 and link 18, as before described. As will be apparent in Figure 2, a movement to the left of member 30 causes member 36 to rotate counterclockwise and close the damper blades, while a reverse movement of member 30 permits a clockwise movement of 36 thus permitting the damper blades to open.

To bias the damper blades 15 and 16 to an open position, counterweights 55 are secured to the upper edge of plate 16 by guide pins 56 and adjusting screws 57. Rotation of an adjusting screw 57 causes movement of a weight 55 toward or away from blade 16 to thus shift the center of gravity of the weight relative to the pivot of blade 16 and thereby adjust the tendency of the weight to bias blade 16 toward an open position. Obviously, biasing blade 16 toward an open position likewise causes blade 15 to be biased open due to the interconnecting linkage. As best shown in Figure 3, weights 55 are of a streamlined shape so that in the open position of damper blades 15 and 16, the air flow between the damper blades will have a minimum effect on the weights. The above described location of weights 55 also has another beneficial effect on this mechanism. By comparing the solid line and the dotted line drawings (Fig. 3) of blade 16 and weight 55 in closed and open position, respectively, it is obvious that weight 55 has much more effect in opening blade 16 as the blade moves toward its fully open position and less effect in opposing the closing of the blade as it moves toward closed position. Thus, a force sufficient to start a closing movement of blades 16 and 15 from a fully open position need be increased only slightly to fully close the blades even though the air force against the blades tends to increase as the blades are moved toward their closed position, this variable effect of the weights 55 thus causing an appreciably reduced operating differential of the dampers. Likewise, with the damper blades 15 and 16 closed and with a maximum force exerted against them due to the pressure of air in the duct, a sufficient force to hold the damper blades closed need not diminish very much to open the blades through their entire range for, as the blades are opened, the decreasing of the force against them due to air pressure is offset by the increase in the opening force due to weights 55 as the blades are opened.

To permit a closing of the blades at any time regardless of the action of the thermostatic means, a suitable lever 60 is pivoted at 61 near the front of the register and is actuated by an eccentric or cam 62 rotatable by a manual knob 63, rotation of knob 63 in either direction, Figure 2, causing a counterclockwise movement of lever 60, thus forcing it against flange 34 to either move it or hold it in an extreme left position, thereby holding the blades closed or moving them closed, as the case may be.

Figure 7:
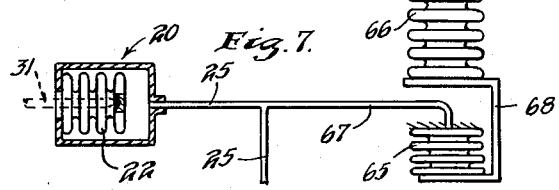
Figure 7 is a schematic view of compensating means for the fluid motor of the apparatus shown in Figures 1 to 6.

When register 10 is used only for controlling heated air, thermostatic bulb, tube 25 and motor 20 may be filled with what is known as a volatile fill, this fill comprising a relatively small amount of a volatile liquid, such as ethyl chloride, which generates an appreciable pressure at normal room temperatures. In this type of fill, the liquid always condenses at the cooler part of the system or, in this case, in the bulb, hence the controlling effect of the thermostatic system will always derived from the bulb temperature. With this sort of fill, the temperature of the motor is of little consequence for the pressure therein is determined by the temperature of the liquid in the bulb, therefore no compensation for motor 20 is needed. However, when the bulb 26, tube 25 and motor 20 are completely filled with an expansible liquid, such as toluene, it is obvious that varying temperatures of motor 20 will also cause movement of bellows 22 and operation of the dampers. To compensate motor 20 for such variation in temperature, compensating bellows 65 and 66, as shown in Figures 2 and 7, are used. Bellows 65 has, for the purpose of this description, a volumetric capacity equal to that of motor 20 and is connected to motor 20 by a tube 67. The upper end of bellows 65 is attached to an extension of a bracket 29, and the upper end of 66 is likewise connected to an extension of bracket 21. Bellows 66 has, for example, a volumetric capacity equal to the combined capacity of bellows 65 and motor 20 and its free end is connected to the free end of bellows 65 by a suitable rigid connecting member or bracket 68 so that movement of the free end of bellows 66 causes a similar movement, and in the same direction, of the free end of bellows 65. With this arrangement, any temperature change in the duct affecting motor 20 also equally affects bellows 65 and 66, they being filled with the same sort of liquid as motor 20. As bellows 65 and motor 20 have in this description, the same volumetric capacity, and as they are affected equally by the same temperature change, no movement of liquid would take place and there would be no compensating effect, considering these elements by themselves. However, the same temperature change has twice the effect on bellows 66 that it has on bellows 65 because of the greater fluid capacity of bellows 66. Therefore, its longitudinal expansion is normally twice that of bellows 65. Because the movement of the free end of bellows 66 is transmitted to the free end of 65 by rigid member 68, an expansion of bellows 66 causes twice as much expansion of bellows 65 as would normally result from the temperature change on bellows 65 alone. The effect of this is to withdraw fluid from motor 20 to offset the extra volume caused by expansion due to the temperature change affecting the motor. Motor 20 is thus fully compensated for temperature change in the air surrounding it, and effective control is exercised by the thermostat bulb located on the wall surface.

As a more general statement of the proper proportions of bellows 65, 66 and motor 20, it is necessary that the motion per °F. change of temperature of bellows 66 and the corresponding motion of bellows 65 must be such that it changes the volume of bellows 65 by the amount of change in volume produced by the change in temperature on the liquids in both motor 20 and bellows 65. Expressed mathematically, this relation is:

$$L20 + L65 = \frac{A65}{A66} \times L66$$

where $L20$=volume of liquid at temp $T1$ in motor 20.
$L65$=volume of liquid at temp $T1$ in bellows 65.
$L66$=volume of liquid at temp $T1$ in bellows 66.
$A65$=effective area of bellows 65.
$A66$=effective area of bellows 66.
$T1$=temperature affecting bellows 65, 66 and motor 20.

Figure 5:
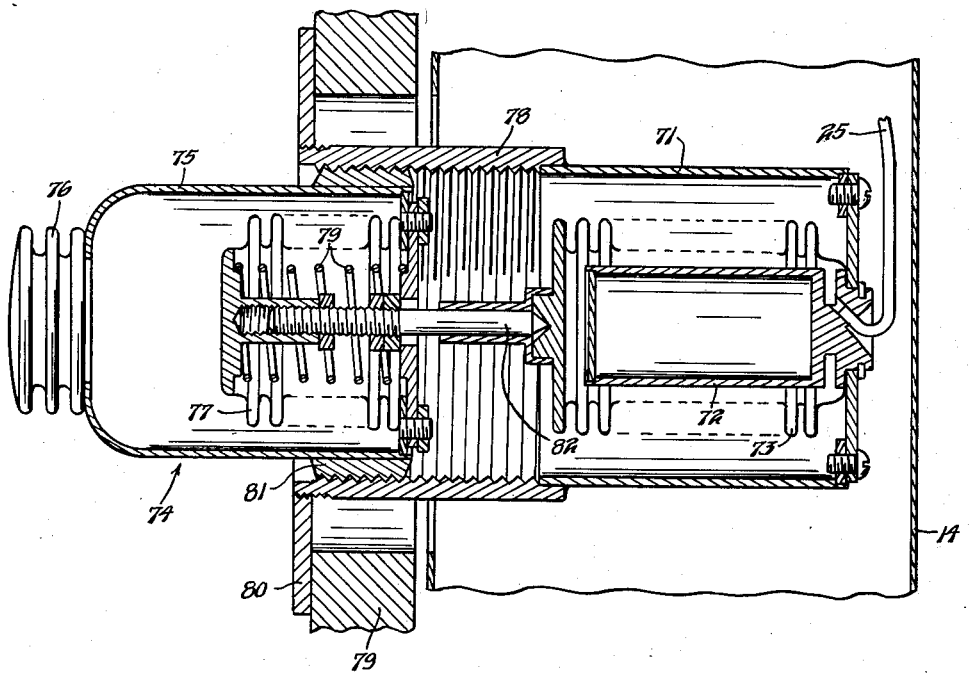
Figure 5 is a sectional view of the thermostatic device of the modification of Figure 4.

A modification of the apparatus shown in Figures 1 to 3, as shown in Figures 4 and 5, involves a damper mechanism similar to that shown in the above figures excepting that member 31 is not extended through the front of register 10 hence adjusting knob 32 is not used, and a slightly different thermostatic mechanism is used to power motor 20. It is sometimes difficult to use the remote bulb construction of Figure 1 in old construction but, because the thermostatic apparatus of Figures 4 and 5 can be passed down through the duct from the register and fished out through a hole in the wall and the duct at the proper level, this apparatus is usable in any installation where the register is located above the thermostat and its supply duct, the preferred location for registers of this sort. In this modification, as in others, similar parts are similarly numbered but, because the register 10 in Figure 4 is essentially the same as that of Figures 1 to 3, it is not shown in detail in this figure. As shown in Figures 4 and 5, tube 25 leads to a bellows 73 contained within a housing 71, bellows 73 having an internal plug 72 for diminishing its volume. With this arrangement, bellows 73, tube 25 and motor 20 are filled with a liquid having, preferably, a low coefficient of expansion, and the bellows 73 and tube 25 merely comprise hydraulic transmission means between a volatile fill thermostat 74 and motor 20. The volatile fill thermostat 74 comprises an outwardly extending cup member 75 having a ribbed or corrugated radiator member or sensing element 76, member 76 having the general appearance of a bellows but being relatively nonexpansible. Radiator member 76 is in fluid flow relation with the interior of member 75 and the other end of member 75 is sealed off by bellows 77, bellows 77 being urged to the left by a compression spring 79. The space defined by member 75, bellows 77 and sensing element 76 is charged with a volatile fluid such as ethyl chloride, such a charge requiring only a small amount of liquid.

Housing 71 surrounding bellows 73 is secured to an internally threaded member 78 which in turn is secured to the outer surface of a wall 79 by a removable flange 80, this flange being removed when the element is dropped down through the duct and fished out through the hole in the wall. Thermostatic element 74 is provided with a threaded rim 81 engageable with the threads of member 78, so that rotation of member 74 causes a movement of said member toward or away from bellows 73. Bellows 77 is connected to bellows 73 by a compression member 82 so that pressure generated in element 74 by its charge of volatile fluid is exerted against bellows 77 and transmitted therethrough by member 82 to bellows 73 which in turn transmits the exerted force to motor 20 and causes operation of damper blades 15 and 16 in a manner previously described. While bellows 73 is subject to heat from duct 14, actual control by the present device is due to the pressure generated by the volatile fluid in element 74 hence, the expansion or contraction of the liquid in the fluid drive portion of this system is of little consequence. Because sensing element 76 is normally the coolest part of this thermostatic apparatus, the liquid of the fill tends to condense at this point, hence the controlling effect of this device is derived from the temperature at element 76 even though the innermost part of member 74 may be considerably warmer.

As before suggested, the control point of this thermostatic mechanism is adjusted by rotating member 74 to move it inwardly or outwardly relative to bellows 73. Obviously, if the control point is adjusted sufficiently, the dampers 15 and 16 may be opened or closed by an adjustment of this thermostatic device but, as shown in Figure 4, knob 63 and its associated cam 62 and lever 60 may also be provided for a positive manual closing of the dampers, if desired.

Figure 6:
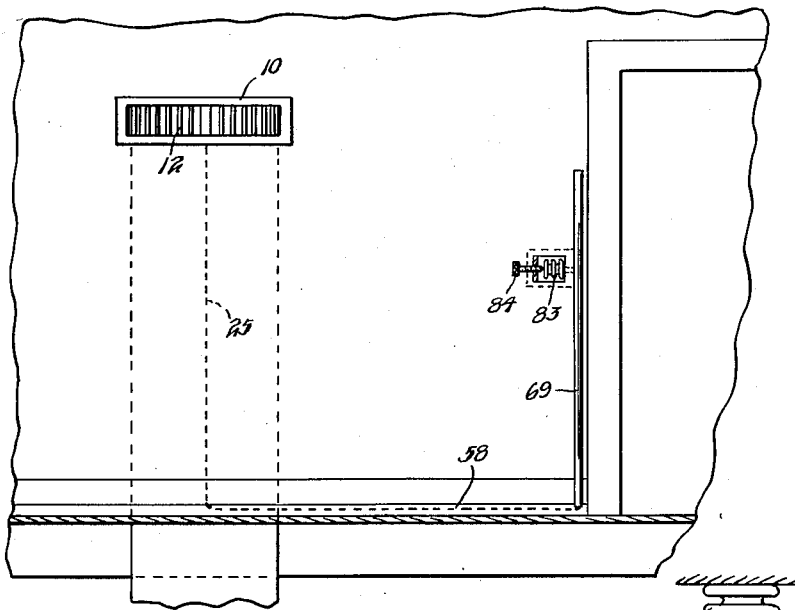
Figure 6 is an elevation view of another modification of the structure shown in Figure 1.

Another modification of the present apparatus especially useful with a complete liquid fill is that shown in Figure 6. In this modification, tube 25 is threaded down through the duct to the floor line and taken out through a hole in the duct and wall at this point, then run along the baseboard of the room behind the quarter round or shoe 58 until a door frame or the like is reached at which point it joins a thermostatic bulb 69 of relatively small diameter and considerable length. As an example of a suitable size, about ½" in diameter and about 5 or 6 ft. in length is suggested. A bulb of this size has a relatively large volume compared to tube 25 and motor 20 hence minimizes the need for compensation and is effective to give a relatively small differential in the operation of the dampers. In addition, because it extends from near floor line to a point above the normal breathing line, a good average response to conditions in the occupied portion of the room is obtained. By locating this elongated tube near a door frame, it is relatively inconspicuous and protected from damage. To adjust the control point of this mechanism, a bellows 83 is connected to bulb 69 and is adjustable in volume by a thumb screw 84. Adjusting thumb screw 84 varies the volume of bellows 83 and thereby adjusts the volume of liquid in the thermostatic system comprising bulb 69, tube 25 and motor 20, thus adjusting the control point of this apparatus.

Figure 8:
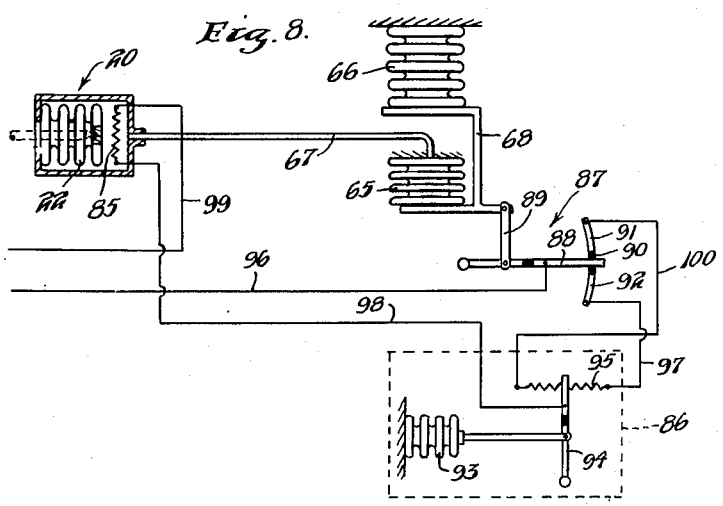
Figure 8 is a schematic view of a modification of the apparatus of Figure 1.

Still another modification of a thermostatic means for operating motor 20 is shown in Figure 8. In this example, motor 20 is filled with an expansible liquid such as toluene and it is also provided with an electrical heating element 85. Motor 20 is compensated for variations in duct temperature by bellows 65 and 66 connected by a member 68 in a manner previously described. In this example, heater 85 is controlled by a thermostat 86 and switching apparatus 87. Switching apparatus 87 comprises a pivoted switch lever 88 connected by link 89 to member 68 and is movable over an electrical dead spot or insulating member 90 and contact 91 or 92 upon movement by member 68 upwardly or downwardly, respectively. Thermostat 86 is of a conventional sort and involves a bellows 93 charged with an expansible fluid connected to a wiper 94 movable over resistor 95. Assuming that the air temperature affecting motor 20 and bellows 65 and 66 is relatively high, as when heat is being supplied to a space, member 68 would then be in a lower position and blade 88 would lie on switch contact 92. In this event, heater 85 is energized by a circuit: line wire 96, switch blade 88, switch sector 92, wire 97, resistor 95, switch blade 94, wire 98, heater 85, and line wire 99. When heater 85 is energized by this circuit, a relatively high temperature at bulb 93 forces wiper blade 94 to the right and diminishes the effective resistance of resistor 95, hence increased heat is applied to motor 20. Increased heat at motor 20 results in a force tending to collapse bellows 22, this resulting in a closing of the damper blades in a manner previously described. Closing of damper blades in this instance results in less heat being supplied to the space in which thermostat 86 is located, and a corrective influence would thus be initiated.

If cold air is being supplied through duct 14, when using the present modification, the liquid fill of motor 20 and bellows 65 and 66 contract and member 68 is moved upwardly, thus shifting switch blade 88 to contact 91. When switch blade 88 is on contact 91, heater 85 is energized by the circuit: line wire 96, switch blade 88, switch sector 91, wire 100, resistor 95, potentiometer arm 94, wire 98, heater 85, and line wire 99. In this instance, a relatively high temperature at 93 causing movement of the blade 94 to the extreme right of resistor 95 inserts the maximum resistance in the control circuit for heater 85, hence a minimum pressure is exerted by motor 20, thereby permitting the damper blades 15 and 16 to fully open. Likewise, a relatively low temperature at bellows 93 causing a movement of blade 94 to the left end of resistor 95 will result in a maximum heating effect on heater 85, thus causing maximum pressure in motor 20 and a closing of dampers 15 and 16. This sequence of operation is recognized as a proper one for cooling control so it is obvious that the compensating bellows 65 and 66, plus their connecting member 68, can be used not only to compensate a fluid motor subject to varying temperatures but they can also be used to vary the sequence of control of the dampers from a cooling sequence to a heating sequence depending upon whether warm air or cool air is delivered to the duct in which they are located.

Because modifications other than those shown are apparent to those understanding the present invention, the scope of this invention is intended to be limited only by the appended claims.

I claim as my invention:

1. An automatic register comprising a frame portion, a damper blade pivotally mounted in said frame portion, a fluid motor attached to said portion, a horizontally movable member operable by said motor, a hollow sleeve adjustable along said member, a pivotally mounted cam-like member having a partly cylindrical surface for guiding said sleeve and said member, a flexible tape attached to said sleeve and to said cam-like member, strain release means attached to said blade, said tape also being attached to said strain release means whereby longitudinal movement of said horizontally movable member causes a pivotal movement in one direction of said blade, counterweight means attached to said blade for causing it to move in the opposite direction, thermostatic means for varying the pressure in said fluid motor, and manual means for independently moving said horizontally movable member.

2. An air flow control register including a frame portion, a damper blade pivotally attached thereto and movable between open and closed positions, means for urging said blade to its open position, a longitudinally movable member extending transversely of said damper blade, means for guiding said member, said guiding means including a cam-like member having a partly cylindrical surface and an outer curved surface, a lever pivotally attached to said blade, a spring biasing said lever against said blade, a sector member attached to said lever and having at least a portion of its outer surface formed about the pivotal attachment of the damper blade as a center, and flexible tape means extending over the outer surface of said sector member and said outer curved surface and attached to said lever, said cam-like member and said longitudinally movable member so that movement of said movable member will be transmitted to said damper blade.

3. An automatic flow control apparatus including adjustable damper means, a horizontally movable member having longitudinally disposed relatively adjustable portions, one portion of said member being attached to said damper means to cause movement thereof upon movement of said member, motor actuated means engaging another portion of said member for causing movement thereof, thermostatic means for controlling said motor means, manual adjusting means for adjusting the relative longitudinal position of the portion of said movable member, and manual means for moving said member to close said damper means.

4. Flow control means including pivotally mounted damper means, thermostatic means for closing said damper means, and counterweight means for opposing the efforts of said thermostatic means, said counterweight means being connected to said damper means and located in the flow passage through said control means, said counterweight means being shaped to cause a minimum resistance to flow as the damper means approaches a fully open position.

5. Control apparatus for a flow regulating device including a frame portion, a movable flow controlling member attached to said frame portion, a motor means attached to said member and to said frame portion for operating said member, thermostatic means responsive to the ambient temperature of said motor means and connected to said motor means for compensating said motor means against changes in said ambient temperature, condition responsive means for controlling said motor means, means connecting said condition responsive means to said motor means, and switching means operated by said thermostatic means and arranged in said connecting means for reversing the sequence of the control exercised by said condition responsive means over said motor means.

6. Flow control apparatus including a movable member, a heat motor for moving said member, thermostatic means arranged to compensate said motor against changes in ambient temperature, electric circuit means connected to said heat motor for controlling the same, and switching means connected to said circuit means and arranged to be operated by said thermostatic means for reversing at least a part of said electric circuit means in response to predetermined ambient temperature changes.

7. Automatic flow control apparatus including a frame portion, a movable flow controlling member attached to said frame portion, a motor means attached to said frame portion, an elongated threaded member engaging said motor means at one end and having a manual adjusting knob on its other end, a sleeve threaded over said threaded member, means for preventing rotation of said sleeve, mechanical means operatively connecting said sleeve to said movable flow controlling member, and cam means operable independently of said adjusting knob for moving said sleeve and thereby operating said member.

8. A flow control apparatus including a frame, a horizontally disposed damper blade pivotally mounted therein along one of its edges and movable between open and closed positions, means including a weight for biasing said blade to its open position, said weight being located near an edge of said blade remote from the pivotal mounting of the blade and arranged to be in substantially vertical alignment with said pivotal mounting when said blade is closed and horizontally spaced from said pivotal mounting when said blade is wide open, and means for varying the proximity of said weight to said blade.

WALTER W. VOSS.

REFERENCES CITED

The following references are of record in the file of this patent:

UNITED STATES PATENTS

| Number | Name | Date |
|---|---|---|
| 236,520 | Westinghouse | Jan. 11, 1881 |
| 1,186,180 | Fulton | June 6, 1916 |
| 1,440,497 | Shurtleff | Jan. 2, 1923 |
| 1,830,869 | Charles | Nov. 10, 1931 |
| 1,833,950 | Modine | Dec. 1, 1931 |
| 1,886,439 | Wells | Nov. 8, 1932 |
| 2,011,546 | Waltenberg | Aug. 13, 1935 |
| 2,072,693 | Volkert | Mar. 2, 1937 |
| 2,088,032 | Noble | July 27, 1937 |
| 2,121,625 | Crago | June 21, 1938 |
| 2,144,121 | Parks | Jan. 17, 1939 |
| 2,194,608 | Miller | Mar. 26, 1940 |
| 2,221,347 | Giesler | Nov. 12, 1940 |
| 2,240,354 | Smith | Apr. 29, 1941 |
| 2,259,973 | Firehammer | Oct. 21, 1941 |
| 2,281,615 | Peple | May 5, 1942 |
| 2,291,884 | Den Besten | Aug. 4, 1942 |
| 2,302,407 | Waddell | Nov. 17, 1942 |
| 2,387,792 | Holmes | Oct. 30, 1945 |